US010669597B2

(12) United States Patent
Ihli et al.

(10) Patent No.: US 10,669,597 B2
(45) Date of Patent: Jun. 2, 2020

(54) SYSTEMS AND METHODS COMPRISING PERMANGANATE FOR IMPROVED PRESERVATION AND YIELD OF CROPS AND RELATED GOODS

(71) Applicant: Carus Corporation, Peru, IL (US)

(72) Inventors: Sam Ihli, Lake Charles, LA (US); John Sanders, Missouri City, TX (US); John Boll, Aurora, IL (US)

(73) Assignee: Carus LLC, Peru, IL (US)

( * ) Notice: Subject to any disclaimer, the term of this patent is extended or adjusted under 35 U.S.C. 154(b) by 0 days.

(21) Appl. No.: 16/257,950

(22) Filed: Jan. 25, 2019

(65) Prior Publication Data

US 2020/0017927 A1    Jan. 16, 2020

Related U.S. Application Data

(60) Provisional application No. 62/697,708, filed on Jul. 13, 2018.

(51) Int. Cl.
*C13B 10/00* (2011.01)
*C13B 10/14* (2011.01)
(Continued)

(52) U.S. Cl.
CPC .............. *C13B 10/14* (2013.01); *A23B 7/157* (2013.01); *A23L 2/44* (2013.01); *A23L 2/72* (2013.01);
(Continued)

(58) Field of Classification Search
None
See application file for complete search history.

(56) References Cited

U.S. PATENT DOCUMENTS

| 83,974 A | 11/1868 | Knaggs |
| 2,070,959 A * | 2/1937 | Smith ...................... C13B 5/08 241/238 |

(Continued)

FOREIGN PATENT DOCUMENTS

| CN | 102077824 | 4/2013 |
| CN | 107466644 | 12/2017 |

(Continued)

OTHER PUBLICATIONS

Kimbough, the french screw press on cush cush, ps, 179-182 (Year: 1970).*

(Continued)

*Primary Examiner* — Stefanie J Cohen
(74) *Attorney, Agent, or Firm* — Adam J. Fromm; Clark Hill PLC

(57) ABSTRACT

Preferred embodiments of the present invention comprise the optional application of concentrations of an aqueous permanganate solution, such as an approximately 0.01% A to approximately 50% liquid permanganate solution and preferably comprising approximately 20% sodium permanganate dosed at approximately 1 ppm to approximately 100 ppm to harvested sugar crops, such as sugarcane, sugar beets, and sweet sorghum, at one or more of the sugar processing steps for the crops. The steps where the liquid sodium permanganate may optionally be applied include at a sugar crop cutting step, a sugar crop conveying step, a sugar juice extraction step, a sugar juice clarifying step, and a clarifier muds filtration step. The application of liquid sodium permanganate in the processing of sugar from sugar crops results in reduced equipment fouling, reduced loss in juice purity, reduced scale formation, decreased turbidity in clarified juices, increased sugarcane processing rates, (Continued)

reduced sugar crop production costs, increased sugar product yield, and increased production capacity.

24 Claims, 19 Drawing Sheets

(51) Int. Cl.
  *A23L 2/72* (2006.01)
  *A23L 2/44* (2006.01)
  *C13B 5/02* (2011.01)
  *C13B 20/16* (2011.01)
  *C13B 30/00* (2011.01)
  *A23B 7/157* (2006.01)
(52) U.S. Cl.
  CPC ............... *C13B 5/02* (2013.01); *C13B 20/16* (2013.01); *C13B 30/002* (2013.01); *A23V 2002/00* (2013.01)

(56) References Cited

U.S. PATENT DOCUMENTS

| | | | |
|---|---|---|---|
| 2,082,656 A | | 6/1937 | Reichert et al. |
| 2,495,334 A | | 1/1950 | Lande |
| 2,518,296 A | | 8/1950 | Eguchi et al. |
| 2,533,357 A | * | 12/1950 | Crawford ............. A23N 12/005 127/2 |
| 2,785,998 A | | 3/1957 | Harding et al. |
| 3,248,264 A | * | 4/1966 | Welch ..................... C13B 20/02 127/48 |
| 3,278,166 A | * | 10/1966 | Miles ..................... B01D 37/00 366/170.3 |
| 3,483,120 A | * | 12/1969 | Hatch .................. C02F 1/5236 210/721 |
| 5,855,168 A | * | 1/1999 | Nikam ..................... B30B 9/12 100/110 |
| 6,245,153 B1 | | 6/2001 | Gonzales |
| 2004/0231663 A1 | | 11/2004 | Carter et al. |
| 2005/0016145 A1 | * | 1/2005 | Huff, Jr. ................. A01D 43/14 56/16.4 R |
| 2009/0305888 A1 | | 12/2009 | Li et al. |
| 2012/0009641 A1 | * | 1/2012 | Kulkarni ............... C13B 20/005 435/161 |
| 2014/0000586 A1 | | 1/2014 | Mantelatto |
| 2016/0249669 A1 | * | 9/2016 | Schnorr ................ C13B 20/002 426/10 |

FOREIGN PATENT DOCUMENTS

| | | |
|---|---|---|
| CN | 107950314 | 4/2018 |
| CN | 108380185 | 8/2018 |
| GB | 189826475 | 11/1899 |
| GB | 183485 | 1/1924 |

OTHER PUBLICATIONS

Rainey et al, developments in mud filtration technology in the sugarcane industry, sugarcane: production, consumption and agricultural management systems (Year: 2014).*

Kimbrough, the french screw press on cush-cush—a step toward maximizing capacity, manufacturing-engineerng (Year: 1971).*

Solomon, Post-Harvest Cane Deterioration and its Milling Consequences, Sugar Tech, 2000, pp. 1-18, vol. 2, Indian Institute of Sugarcane Research, India.

Solomon, Post-harvest deterioration of sugarcane, Sugar Tech, 2009, vol. 11(2); pp. 109-123, Indian Institute of Sugarcane Research, India.

Chaves, et al., Use of Potassium Permanganate in the Sugar Apple Post-Harvest Preservation, Somenta, 2007, vol. 5(5), pp. 346-351, Universidade Estadual do Sudoeste da Bahia, Brazil.

Form PCT/ISA/210, PCT Notification of Transmittal of the International Search Report, PCT/US2019/015226, dated Mar. 26, 2019.

* cited by examiner

SYSTEMS AND METHODS COMPRISING PERMANGANATE FOR IMPROVED PRESERVATION AND YIELD OF CROPS AND RELATED GOODS

CROSS REFERENCE TO RELATED APPLICATIONS

This application claims the benefit of provisional patent application U.S. Ser. No. 62/697,708 filed on Jul. 13, 2018, which is incorporated by reference herein for all purposes.

FIELD OF THE INVENTION

The present invention relates to systems and methods for improving sugar yield and production efficiency. More specifically, the present invention concerns the application of concentrations of a permanganate, such as liquid sodium permanganate, to harvested sugar crops, such as sugarcane, sugar beets, and sweet sorghum, during processing of the crops for the purpose of increasing sugar yield and productivity.

BACKGROUND OF THE INVENTION

The main objective of processing sugar crops is to extract sugar, and it is important to not only maximize sugar extraction but to also minimize sugar degradation during processing. Post-harvest sugar deterioration is a well-known problem. Mechanical harvesting of sugar crops, annual freezes, and extended storage of crops prior to processing (due to sugar mill shutdowns, long term cut-to-crush times, etc.) may lead to post-harvest sugar crop deterioration due to microbial contamination, which affects both sugar crop growers and sugar mills.

It is also important to maximize mill production efficiency by minimizing downtime and capacity constraints brought about by cleaning operations. Such operations take away from the productivity of the mill and incur costs for cleaning chemicals and labor.

Sugar crop processing, sugar beet processing, and sugar sorghum processing share many of the same equipment, processes, and problems. In short, these processes include the steps of: (i) extracting juice from a plant source by mechanically breaking up the plant structure combined with washing with water or thin recycle juice termed imbibition water; (ii) moving the juice through chemical and mechanical purification to separate solids and impurities; (iii) concentrating the juice in multistage evaporators; and (iv) vacuum boiling the concentrated juice to crystallize the raw sugar. Sugarcane, as will be described below, is but one of several sugar crops known to encounter similar problems and that will also benefit from the invention.

Microbial contamination by way of microorganism invasion in sugarcane stalks occurs primarily through cut ends of the harvested stalks. Once the microorganisms are established in a sugar juice rich region of the sugar cane stalks the microorganisms rapidly proliferate. *Leuconostoc* and *serratia* are two of the most devastating bacterial microbes, causing large amounts of post-harvest sucrose losses in sugarcane. As a byproduct of microbial activity, dextran and other polysaccharides are synthesized from sucrose. In addition to the loss of sugar product to these metabolism pathways, the byproducts also cause problems in sugar processing.

Sugar crop deterioration is a well-documented problem. It affects both the cane growers and the sugar mills. Cane deterioration leads to many mechanical and operational problems in sugar mills, including poor clarification, evaporator scaling, decreased crushing rates, increased viscosity of massecuites, crystal elongation, false grain formation, and centrifugation difficulties. Corresponding economic losses are incurred due to yield loss, impurities in the raw sugar product, and increased chemical usage for cleaning of devices used in the production process. Microbial activity utilizes and deteriorates existing sugars to form products such as dextrans, exopolysaccharides, oligosaccharides, organic acids, ethanol, and mannitol.

Currently, microbial activity and the formation of microbial byproducts are managed by the application of biocides, dextranase, amylase, surfactants, viscosity modifiers, and other sanitation chemicals. Drawbacks of these approaches include storage and handling of hazardous chemicals, ineffectiveness of many biocides towards *Leuconostoc* and *Serratia* bacteria, high corrosion of equipment from use of chlorine-based biocides, chlorine organic byproduct formation from use of chlorine-based biocides, the high cost of dextranase, the long residence time required for dextranase, and the high cost and downtime incurred by evaporator shutdowns for chemical cleaning. The sugar industry continues to lose millions of dollars annually due to sugar losses from sugar degradation and low-quality sugar due to degradation byproducts. In addition, the industry also spends millions of dollars on enzymes, processing aids, equipment cleaning products, replacement equipment, and employee time lost on equipment maintenance, cleanouts, and repairs.

As a readily available, economical, and versatile oxidizing agent, permanganate ($MnO_4^{-1}$) has played a key role in hundreds of industrial, agricultural, and aqua cultural processes. Permanganate is used for the modification, purification, sanitation, cleaning, bleaching, and deodorizing of commercial products. These commercial products include foods, food additives, and drinking water.

Accordingly, there exists an unmet need in the art for compositions and methods comprising permanganate for the treatment of sugar crops for the reduction of sugar mill production costs and increasing of quality sugar yield.

SUMMARY OF THE INVENTION

To resolve the aforementioned unmet need in the art, the present invention comprises permanganate-based systems and methods for reduction of exopolysaccharides, and reduction of bacterial growth in sugar crop processing. In particular, preferred embodiments of the present invention comprise sodium permanganate application during crop storage, sugar juice clarification, and/or at multiple steps in mill processing to reduce polysaccharide formation, sugar juice viscosity, and turbidity. The processing areas where improvements occur as a result of the present invention include reduced equipment fouling, reduced loss in juice purity, reduced scale formation, decreased turbidity in clarified juices, and increased sugarcane processing rates. The invention results in reduced sugar crop processing costs, increased sugar product yield, and increased production capacity.

Preferred embodiments of the present invention comprise sodium permanganate ($NaMnO_4$) provided to sugar crops during processing, wherein the preferred applied dosage of 20% sodium permanganate solution has a range of 1 parts per million ("ppm") to 100 ppm. When applied to sugar crops, such as sugarcane, sugar beets, and sweet sorghum, sodium permanganate significantly reduces microbial contamination and exopolysaccharide contamination. This effectively reduces sucrose losses and processing costs.

The present invention is unique in several respects and it advantageously resolves several major issues in sugar processing technology, wherein sodium permanganate may be used: (i) to degrade oligosaccharides and polysaccharides that are either native to the sugar crop or formed due to microbial activity (e.g., dextrans and exopolysaccharides); (ii) as a disinfection compound during sugar milling and processing to reduce exopolysaccharide formation and microbe growth; (iii) to enhance clarification and reduce turbidity in sugar solutions; (iv) to reduce viscosity problems in sugar solutions; (v) as a substitute to biocides and other sanitation products; (vi) to reduce scheduled equipment cleaning and maintenance (e.g. de-scaling); and (vii) to reduce loss in juice purity.

A preferred embodiment of the present invention comprises:

A method for improving production of sugar from sugar crops, the method comprising the steps of:
  (i) preparing a sugar crop to form a prepared sugar crop for milling in a sugar mill to extract sugar therefrom;
  (ii) optionally applying a first application of an aqueous permanganate solution to the prepared sugar crop;
  (iii) conveying the prepared sugar crop to the sugar mill;
  (iv) optionally applying a second application of the aqueous permanganate solution to the prepared sugar crop as the prepared sugar crop is being conveyed to the sugar mill;
  (v) processing the prepared sugar crop in a tandem mill of the sugar mill to form a processed sugar crop;
  (vi) optionally applying a third application of the aqueous permanganate solution to the processed sugar crop at the tandem mill and/or to the imbibition water used to wash the processed sugar crop at the tandem mills;
  (vii) forming cush cush and extracting sugar juice from the processed sugar crop to form extracted sugar juice;
  (viii) optionally applying a fourth application of the aqueous permanganate solution to the cush cush;
  (ix) optionally applying a fifth application of the aqueous oxidant solution comprising a permanganate to the extracted sugar juice;
  (x) clarifying the extracted sugar juice in a clarifier to form clarified sugar juice and clarifier muds;
  (xi) filtering the clarifier muds to form a clarifier muds filtrate; and
  (xii) optionally applying a sixth application of the aqueous permanganate solution to the clarifier muds filtrate being recycled;
wherein at least one of the optionally applying steps (ii), (iv), (vi), (viii), (ix), and (xii) is performed; and
wherein the aqueous permanganate solution comprises approximately 0.01% to approximately 50% by weight permanganate.

In preferred embodiments of the present invention, the aqueous permanganate solution preferably comprises approximately 10% to approximately 30% sodium permanganate and most preferably 20% sodium permanganate which is dosed at concentrations ranging from approximately 1 parts per million to approximately 100 parts per million.

DETAILED DESCRIPTION OF THE INVENTION

While the present invention may be susceptible to embodiment in different forms, there are described herein in detail, specific embodiments with the understanding that the present disclosure is to be considered an exemplification of the principles of the invention, and is not intended to limit the invention to that described herein.

Figure 1:
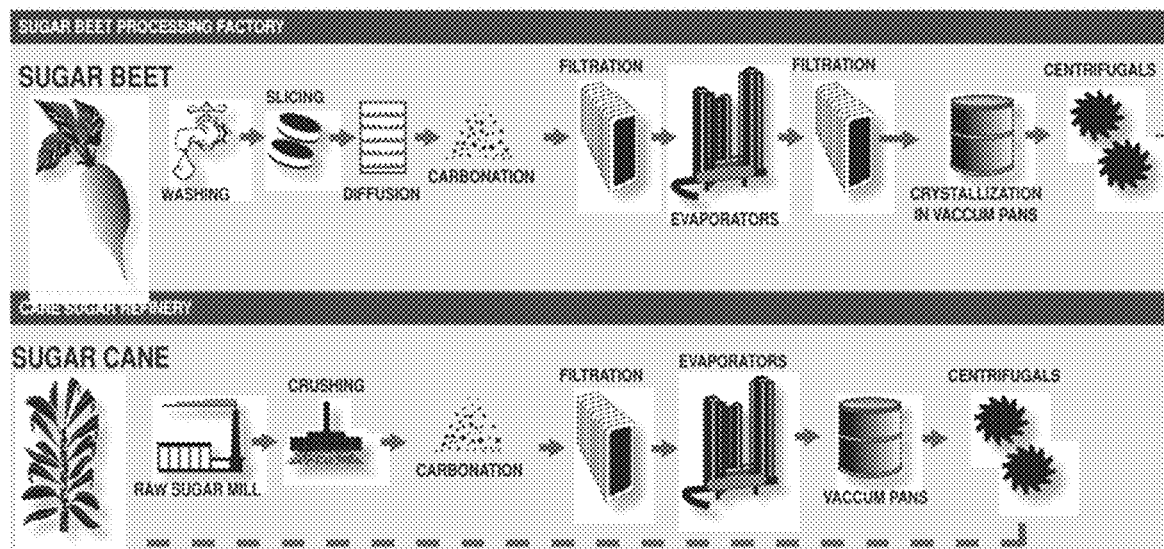
FIG. 1 is an illustration showing basic steps of sugarcane versus sugar beet processing.

FIG. 1 shows the basic steps of sugarcane versus sugar beet processing.

Figure 2:
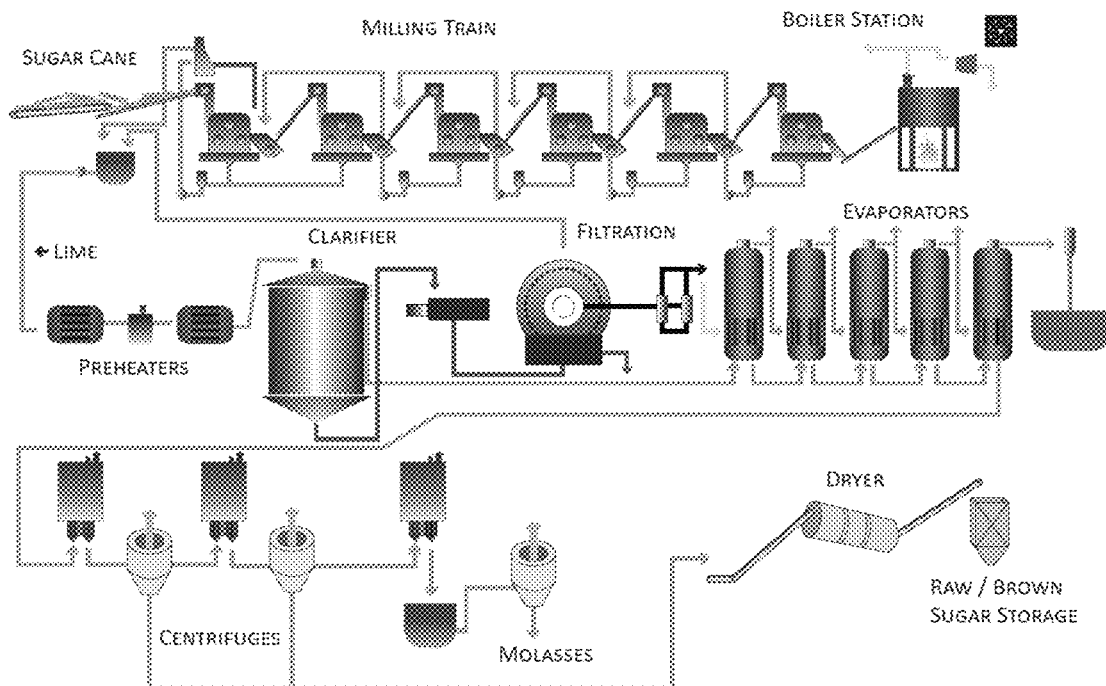
FIG. 2 is an illustration showing sugar cane processing steps.

FIG. 2 shows the basic stages of sugar crop milling. These stages are:
1. First, sugar cane is harvested and preferably cut into billets or stalks.
2. Second, the sugar cane billets or stalks are washed and cut into shreds by rotating knives.
3. Next, huge rollers in the milling train press the juice out of the shredded pulp.
4. The juice is then clarified—by adding milk of lime and polymers. The resulting mixture forms calcium carbonate, which attracts the non-sugar plant materials like wax, fats, and gums from the juice. The calcium carbonate and the other materials are settled out in a clarifier or by filtration.
5. Then the juice is concentrated by removing water from the clarified juice in multiple stages under vacuum. This allows the juice to boil at lower temperatures to protect the sugar from caramelization.
6. The concentrated juice is then crystallized by evaporating the last portion of water under very tight controls in a vacuum pan. Seed grain (pulverized sugar) is fed into the pan as the water evaporates and crystals begin to form. The mixture leaves the vacuum pan as a thick crystal mass and is sent to a centrifuge, a large perforated basket spinning very rapidly much like a washing machine in the spin cycle, where it is spun and dried, thereby yielding golden raw sugar.

Sodium Permanganate for Reduction of Microbes in Sugar Juice

A preferred embodiment of the present invention comprises a blend of permanganate salts that is preferably manufactured as a concentrated liquid. A source of such a liquid sodium permanganate compound is Carus Corporation, located in Peru, Ill., United States of America. Carus Corporation manufactures and markets its liquid sodium permanganate product for use in the sugar industry under the brand name SucrOx™ liquid permanganate. It is contemplated that potassium permanganate may also be used as a substitute for sodium permanganate.

Permanganate is a strong oxidizing agent. As an oxidant, permanganate reacts quickly with inorganic, organic, and biological compounds. In organic chemistry, permanganate is considered a broad-spectrum oxidant because of the many organic functional groups that it reacts with. In particular, permanganate has an affinity for cleaving organic double and triple bonds, making it extremely useful in industrial, municipal, and environmental bleaching and purification applications.

An investigation of biocide use in sugar factories and whether the biocides are effective for the prevention of bacterial sugar loss was performed. Of special interest to sugar mills is the elimination of *leuconostoc* bacteria. *Leuconostoc* metabolizes sucrose producing dextran and other polysaccharides that interfere with down-stream sugar processing. Research shows that traditional biocides, such as sodium hypochlorite, humulone, and carbamate compounds, are not effective for controlling *leuconostoc*, create hazards in storage and handling, and/or create undesirable reaction byproducts.

However, control of *leuconostoc* and *serratia* in sugarcane juice is achieved using liquid sodium permanganate at low parts-per-million dosages. In particular, as shown in FIG. 3, adding liquid sodium permanganate at the second mill to the cush cush (see FIG. 2) and at the sixth mill (id.) at approximately 3 ppm and approximately 6 ppm dosages, respectively, achieves a 2-log reduction in bacteria.

Sodium Permanganate Use for Turbidity Reduction in Sugar Juice

Figure 3:
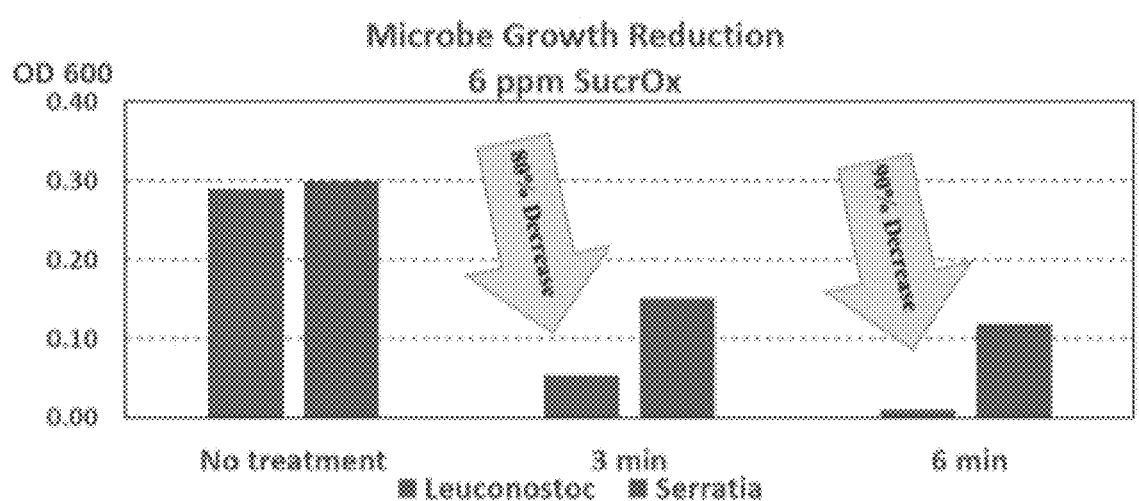
FIG. 3 is a graph showing microbe growth reduction in sugar crops treated in accordance with preferred embodiments of the present invention.
Figure 4:
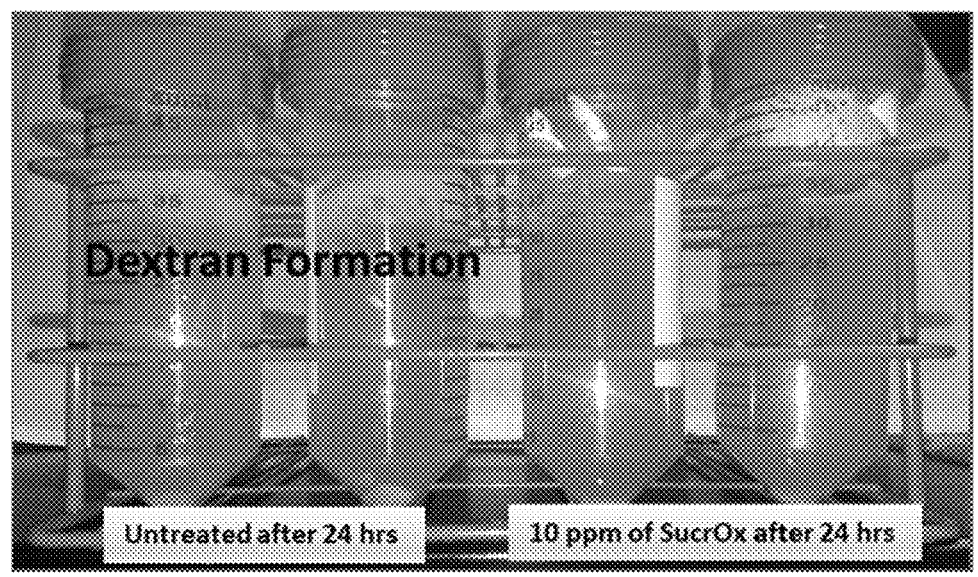
FIG. 4 is a photograph showing dextran formation in sugarcane juice that was untreated as compared to sugarcane juice that was treated in accordance with preferred embodiments of the present invention.

As shown in FIG. 3, sugarcane juice clarity improves and dextran formation is reduced when, for example, approximately 10 ppm of liquid sodium permanganate is applied to the juice. High-performance liquid chromatography ("HPLC") sugar analysis revealed three additional important results: (i) liquid sodium permanganate treatment of sugar cane juice lowers a 15-day average fructose/glucose ratio by approximately 30%, which is an indication of reduced bacterial activity and reduced dextran production; (ii) essentially no mannitol is detected in liquid sodium permanganate treated samples of sugar cane juice; and (iii) mannitol is detected on approximately six out of fifteen days in sugar cane juice samples that are not treated with liquid sodium permanganate. *Leuconostoc* metabolizes sucrose via a dextransucrase enzyme to form fructose and glucose, followed by rapid metabolism of glucose to form dextran. Fructose is metabolized to a lesser degree to form mannitol. A high fructose/glucose ratio plus the presence of mannitol is indicative of a *leuconostoc* infestation of the cane. The observed decrease in the fructose/glucose ratio and levels of mannitol as described above indicate that embodiments of the present invention are inhibiting *leuconostoc* activity.

Figure 5:
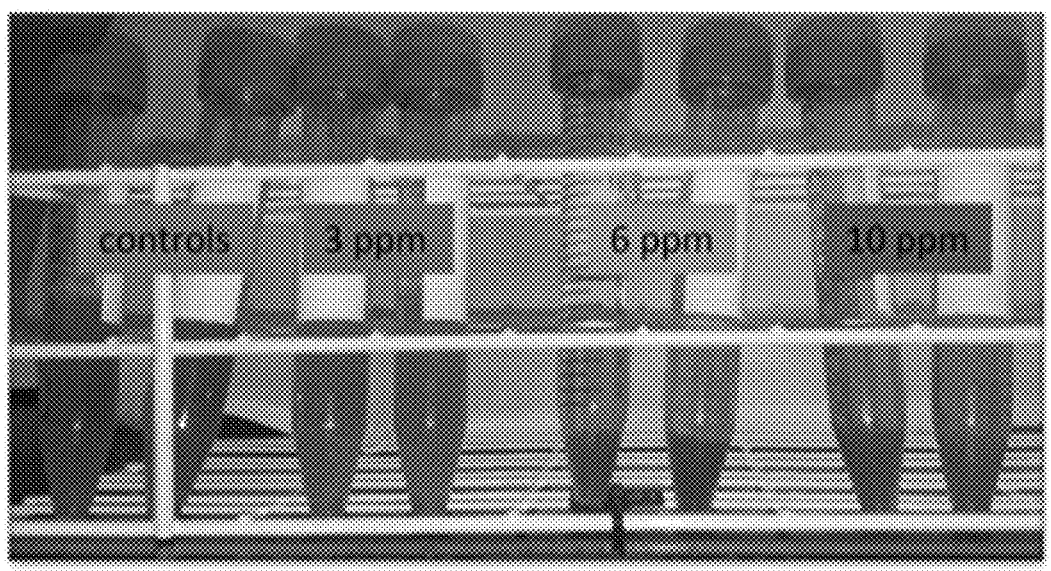
FIG. 5 is a photograph showing the coagulation effects of permanganate in sugar juice.

A reaction byproduct of liquid sodium permanganate is manganese dioxide ($MnO_2$). Manganese dioxide is a small particle, with high surface area and charge, which acts as a coagulation aide in clarifiers (FIG. 5). Additionally, FIG. 5 shows an improvement in floc formation and clarity with progressively higher dosages (3 ppm, 6, ppm, and 10 ppm) of liquid sodium permanganate combined with sugar cane juice samples.

Improvements to Cane Juice Clarification—Mill #1

Several short-term evaluations to determine whether permanganate treatment in accordance with preferred embodiments of the present invention would improve the performance of cane juice clarification process were made. Effectiveness was determined by monitoring the clarified turbidity of the juice. A sugar mill was selected for this purpose ("Mill #1"), in part, because Mill #1 had the capability of operating two identical clarifiers in parallel, allowing Mill #1 staff to evaluate permanganate treatment in one clarifier while using the second as an untreated control unit.

While this was a good set-up for data collection and comparison, it did have one significant limitation. To isolate one clarifier, the permanganate injection point had to be located after the juice flow divides into two separate clarifier inlets. Therefore, permanganate treatment of the cane juice was provided only seconds before the clarifier, shortening the reaction time. In prior tests at other sugar mills, the permanganate was applied much earlier in the process.

At Mill #1, liquid sodium permanganate was fed for 18 days during Mill #1 82-day processing run. The application rate was between approximately 10 ppm and approximately 15 ppm liquid permanganate.

Increases in Sugar Yield—Mill #2

In Mill #2, liquid sodium permanganate was applied during sugarcane crushing season with a focus on biological control impacts. The application point was into the plant cush cush in low, controlled dosages of approximately 3 ppm and approximately 6 ppm of liquid sodium permanganate. In a subsequent year, Mill #2 used permanganate again by ways of an innovative treatment technique. In addition to treating the cush cush, Mill #2 used a second location by spraying liquid sodium permanganate onto sugarcane billets as they were stacked in a yard. As an alternative to spraying, the billets may be dipped or soaked in liquid sodium permanganate solution. Specifically, the billet surfaces were treated, sealing the cuts to the stalk and minimizing sugar loss. The liquid sodium permanganate was fed for 74 days of Mill #2's 102-day run. The average usage rate was approximately 6 ppm of liquid sodium permanganate.

During the following year's harvest season, additional testing on the clarifier effectiveness was conducted while feeding permanganate earlier in the process, giving it a longer reaction time. A feed of approximately 10-15 ppm of permanganate was added to the cane in the yard and to the sugar juice at the cush cush. This testing was performed for 40 days.

Mill #3

Mill #3 used liquid sodium permanganate as a full plant processing aid beginning on the first day of the season. At this site, liquid sodium permanganate was sprayed onto cane billets as they were conveyed to milling knives as well as to cush cush. Liquid sodium permanganate was fed for 111 days, the full mill run.

Mill #3 processed significant amounts of cane and the initial liquid sodium permanganate application rate was approximately 15 ppm of liquid sodium permanganate. Later, the feed rate was increased to nearly approximately 30 ppm and operational and mechanical aspects of Mill #3 continued to improve. At the end of the harvest season, when polysaccharide levels coming from the field are very high, the liquid sodium permanganate feed was increased to as high as approximately 100 ppm of liquid sodium permanganate. Over the full run at Mill #3, the liquid sodium permanganate application rate was calculated to be approximately 30 ppm on average.

The summarized results from the aforementioned mills is reported in Table 1 below, wherein the liquid sodium permanganate is provided under the SucrOx™ brand.

TABLE 1

Summary of Sugarcane Mill Field Trials

| Mill # | Days Grinding | Days SucrOx™ Fed | Average SucrOx™ Dosage | Feed Location | Tons Cane Ground | Lbs Sugar Produced (Millions) |
|---|---|---|---|---|---|---|
| 1 | 82 | 18 | 6 ppm | Clarifier 4 days, cush cush 21 days | 880 | 207 |
| 2 | 102 | 74 | 15 ppm | Cush cush and billets sprayed 74 days | 1650 | 410 |
| 3 | 111 | 111 | 30 ppm | Knives and cush cush for 111 days | 1476 | 336 |

Discussion Regarding Sugar Mill #1

Figure 6:
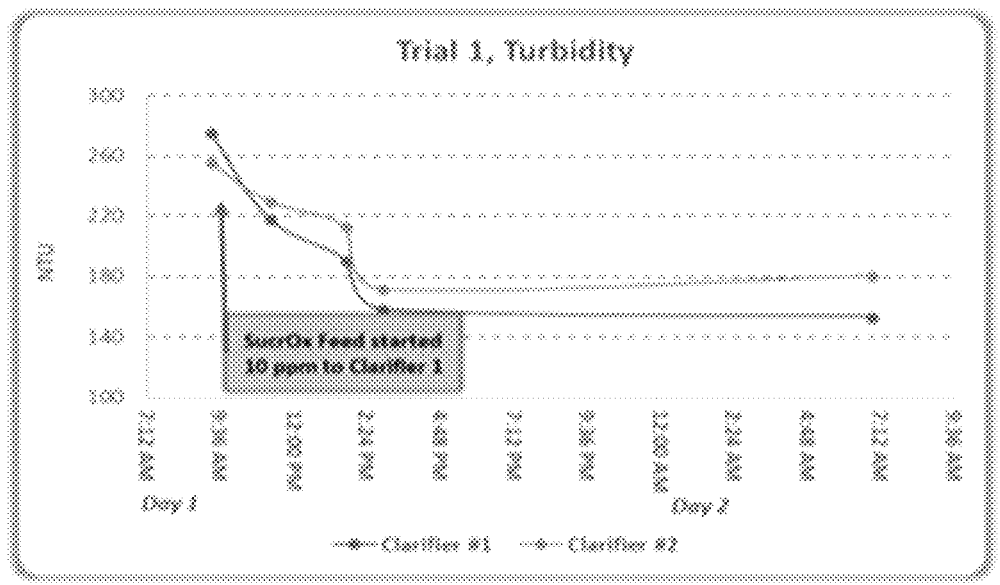
FIG. 6 is a graph showing clarifier turbidity results at Mill #1 comparing treatments without liquid permanganate (0 ppm) and with liquid permanganate (approximately 10 ppm) provided in accordance with preferred embodiments of the present invention.
Figure 7:
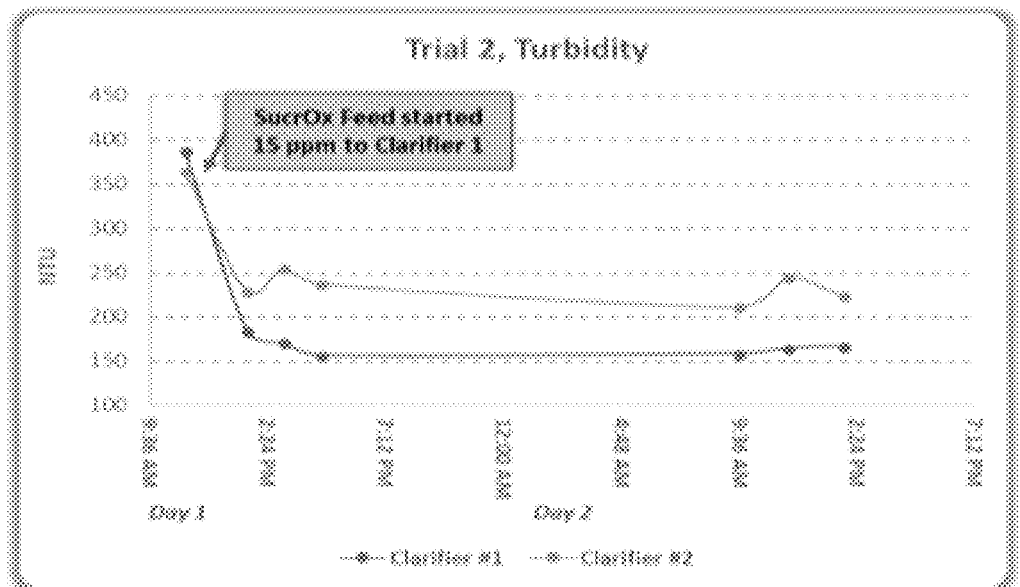
FIG. 7 is a graph showing clarifier turbidity results at Mill #1 comparing treatments without liquid permanganate (0 ppm) and with liquid permanganate (approximately 15 ppm) provided in accordance with preferred embodiments of the present invention.

In two clarification trials run at Mill #1, two different liquid sodium permanganate dosages were used. A first test applied approximately 10 ppm liquid sodium permanganate and the second test applied a higher, approximately 15 ppm dosage. In both trials, the clarifier that was treated with liquid sodium permanganate produced lower effluent turbidities than the untreated clarifier. Further, the clarifier that was treated with approximately 15 ppm had the highest turbidity improvement. It should be noted that both tests were run immediately after plant shut-downs so there is an initial acclimation period for each, but eventually both clarifiers reached a steady state, with minor hourly variations. In Trial 1 (see FIG. 6), the turbidity of the untreated clarifier reached approximately 180 Nephelometric Turbidity Units ("NTU") and the treated clarifier was 150 NTU. In Trial 2 (see FIG. 7), the untreated clarifier nearly achieved 200 NTU, but the liquid sodium permanganate treated clarifier again ran at 150 NTU.

Discussion Regarding Sugar Mill #2

During the following year's harvest season, Mill #2 began feeding sodium permanganate earlier in the process and at multiple locations. In addition to treating the cush cush, the plant used a second location, spraying sodium permanganate onto sugarcane billets as they were stacked in the yard. The intent was to treat the billet surfaces, sealing the cuts to the stalk and minimizing sugar loss. The permanganate was fed for 40 days of Mill #2's 102-day run. The average usage rate was approximately 6 ppm of sodium permanganate (SucrOx™). Under this treatment scenario, the permanganate levels to both clarifiers were equal. With an additional 10 to 40 minutes of reaction time and mixing provided, both clarifiers saw significantly lower turbidities when permanganate was being fed; clarifier with permanganate had 52-108 NTU, versus clarifier without permanganate had 205-220 NTU.

The innovative treatment approach at Mill #2 provided additional and unexpected insight into the positive impact of liquid sodium permanganate treatment. Cane juice purity was recorded at Mill #2 during each crop processing run and, in particular, compared crusher purities at 7:00 am and at 3:00 am. It was generally accepted that cane processed at 3:00 am would always comprise lower purity than the cane processed at 7:00 am. An explanation for this seems to be that the cane processed at 3:00 am had entered the yard during the day, with some of the cane diverted to a storage stack. The stacked cane was only processed when deliveries of harvested cane had ended for the day. Further, when the stacked cane was used, the first cane to be processed was the cane on the top of the stack—the most recent to be delivered. By 3:00 am, the cane that had been in the yard for 12-20 hours was finally crushed.

Figure 8:
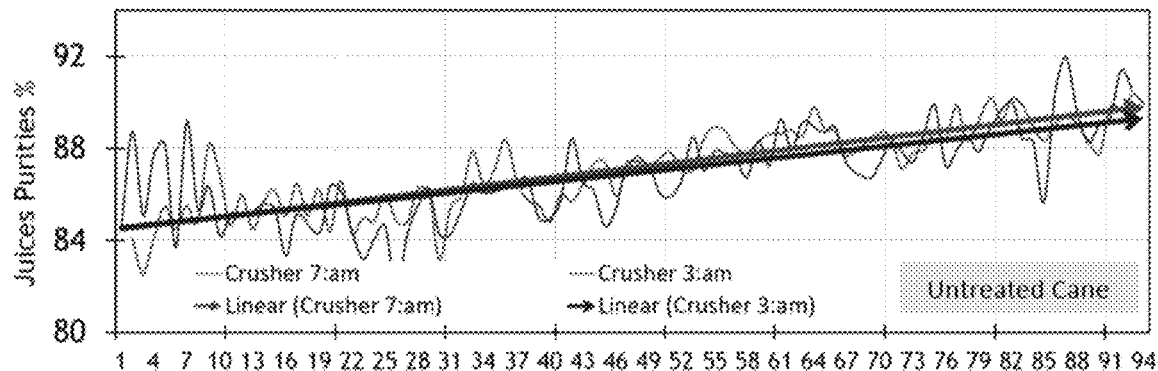
FIG. 8 is a graph showing sugarcane juice purity percentages for composite juice samples in a crusher that were not treated with liquid permanganate.
Figure 9:
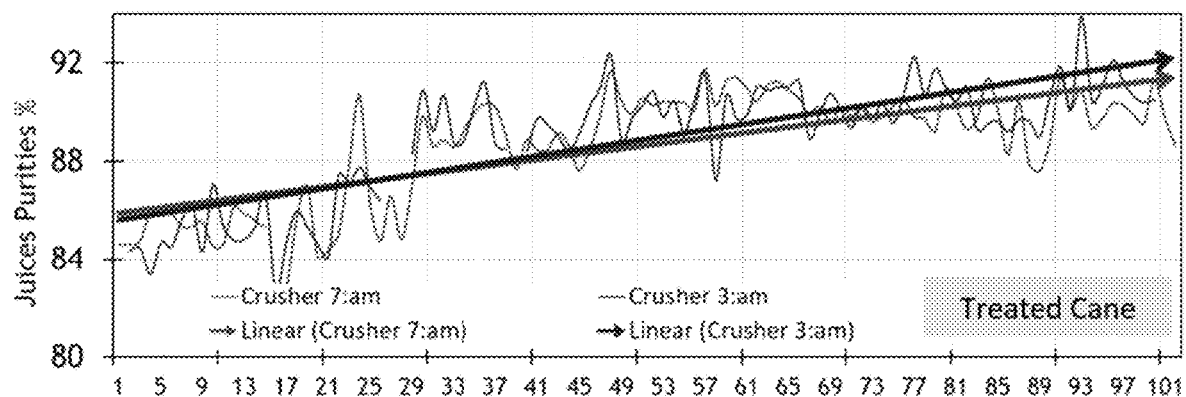
FIG. 9 is a graph showing sugarcane juice purity percentages for composite juice samples in a crusher that were treated with liquid permanganate provided in accordance with preferred embodiments of the present invention.
Figure 10:
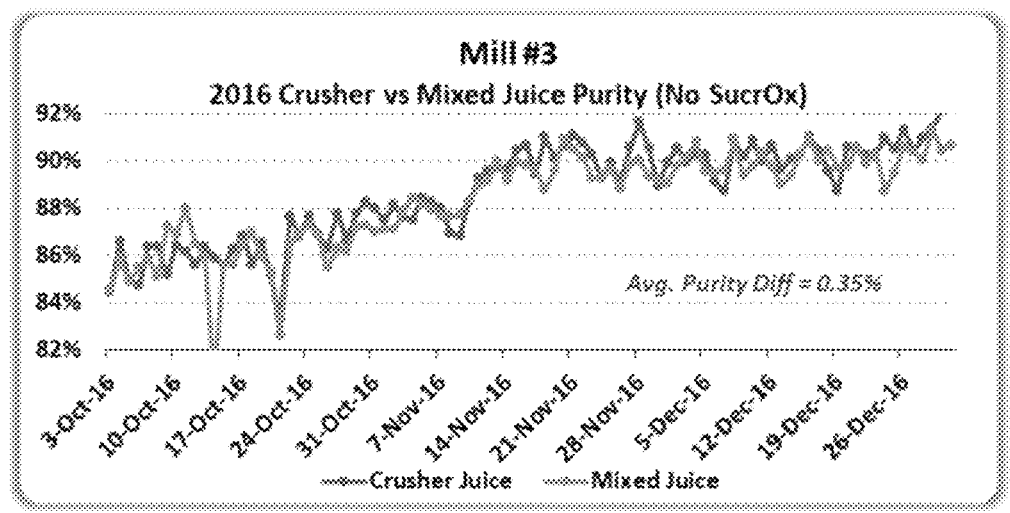
FIG. 10 is a graph showing crusher juice vs mixed juice purity without liquid permanganate treatment at Mill #3.
Figure 11:
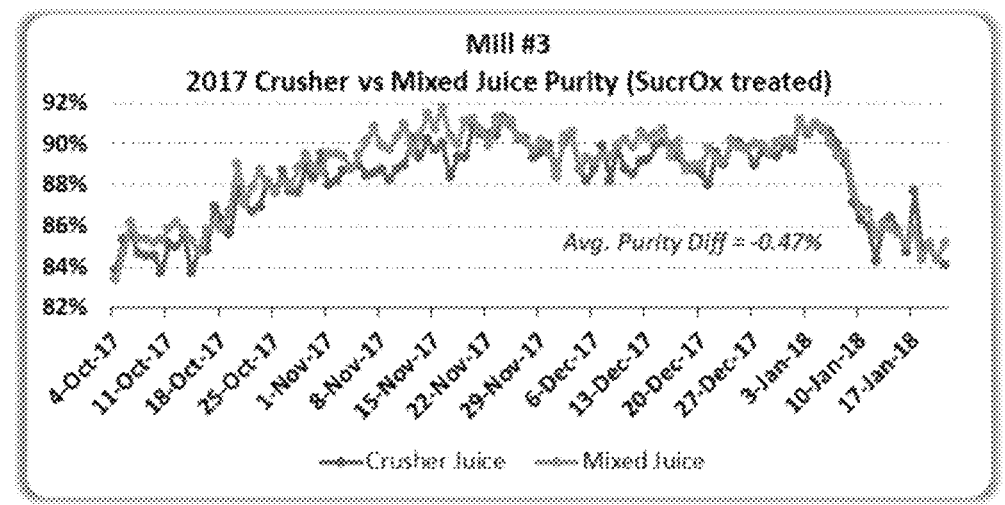
FIG. 11 is a graph showing crusher juice vs mixed juice purity with liquid permanganate treatment at Mill #3 provided in accordance with preferred embodiments of the present invention.
Figure 12:
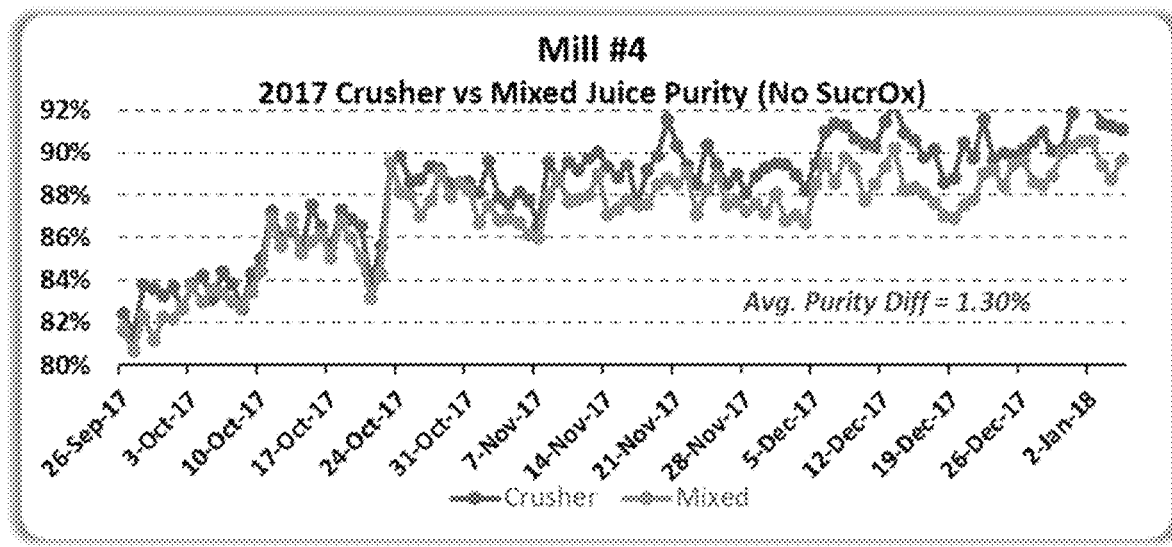
FIG. 12 is a graph showing crusher juice vs mixed juice purity without liquid permanganate treatment at Mill #4.
Figure 13:
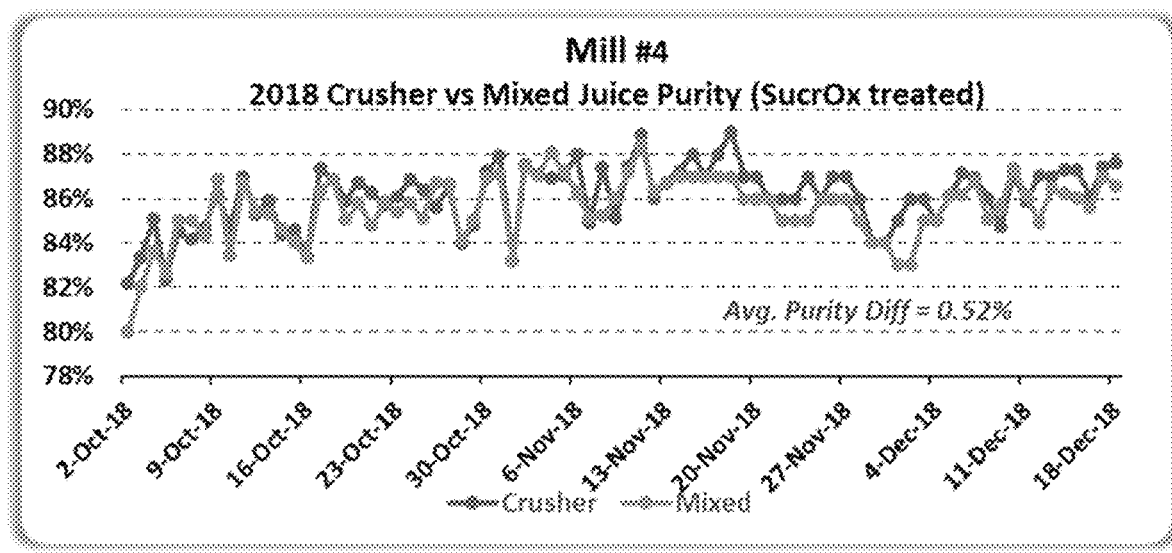
FIG. 13 is a graph showing crusher juice vs mixed juice purity with liquid permanganate treatment at Mill #4 provided in accordance with preferred embodiments of the present invention.

The typically lower quality for 3:00 am cane, although slight, was true in other tests when the cane had not been treated with liquid sodium permanganate. See FIG. 8. However, at Mill #2, when the cane billets entering the yard had been sprayed with liquid sodium permanganate, the data was different. The stacked cane, processed at 3:00 am, ran a higher purity than the freshly harvested, unsprayed cane that was crushed at 7:00 am. See FIG. 9.

Discussion Regarding Juice Purity at all Mills

When comparing results over the 2016, 2017 and 2018 harvest seasons for additional Mills #3, 4, and 5, it was observed that there was improved juice purity when liquid sodium permanganate was employed. Sugar purity (wt. % pol vs. wt. % brix) is measured daily by mill personnel at multiple locations in the milling process. There is consistently a loss of purity from the start to the end of the extraction process. The juice purity typically decreases across the mills by as much as 1-2% or more. However, as noted in graphs 7, 8, 9 and 10, the sugar purity loss is reduced when liquid sodium permanganate (SucrOx™) is used preferably at dosages of at least 10 ppm. See FIGS. 10-13.

Figure 14:
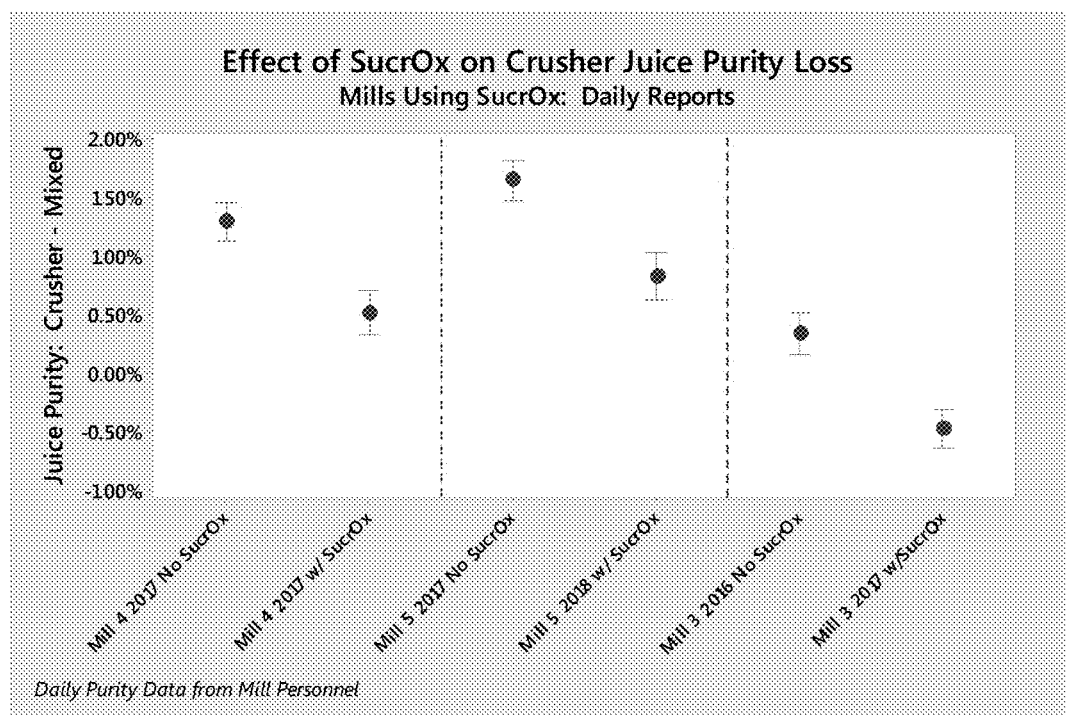
FIG. 14 is a graph showing effects of liquid permanganate treatment on daily juice purity losses from crusher to mixed juice at Mills #3, 4, and 5 provided in accordance with preferred embodiments of the present invention.

One-way analysis of variance ("ANOVA") was performed on daily juice purity readings for entire crop seasons with and without liquid sodium permanganate use at Mills #3, 4, and 5. The difference between crusher juice at the start of the extraction and the mixed juice after extraction steps is plotted in FIG. 14. On average, sugar purity improved by 0.8% for the crops treated with liquid sodium permanganate. The 95% confidence intervals indicate that the improvement associated with SucrOx™ is statistically significant.

Figure 15:
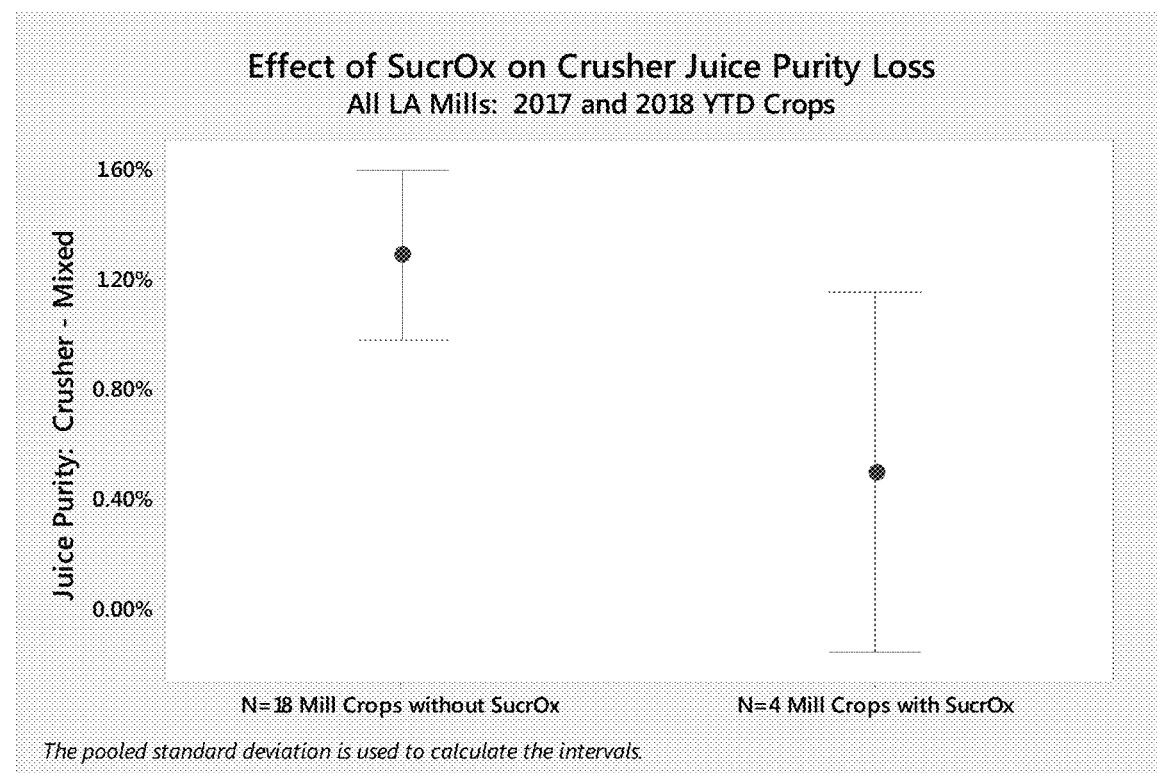
FIG. 15 is a graph showing effects of liquid permanganate treatment provided in accordance with preferred embodiments of the present invention, as compared to the absence thereof, on juice purity in crushers at all mills located in Louisiana where testing occurred.
Figure 16:
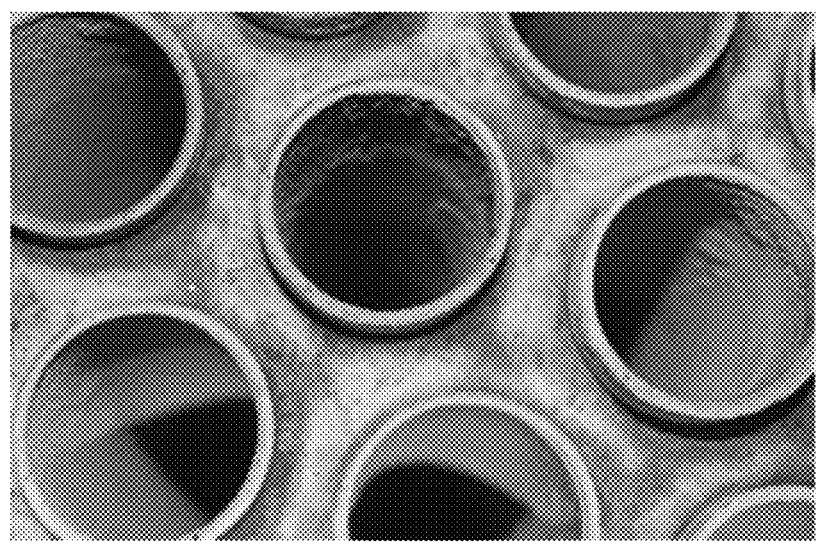
FIG. 16 is a photograph of evaporator tubes after two weeks of conventional juice treatment at Mill #5, the tubes showing hard scale.
Figure 17:
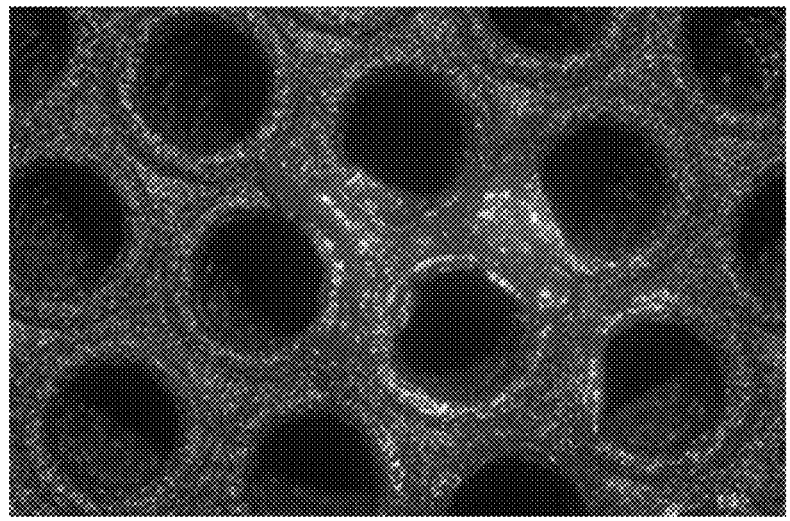
FIG. 17 is a photograph of evaporator tubes after two weeks of application with liquid sodium permanganate treatment provided in accordance with preferred embodiments of the present invention at Mill #5, the tubes showing reduced hard scale.
Figure 18:
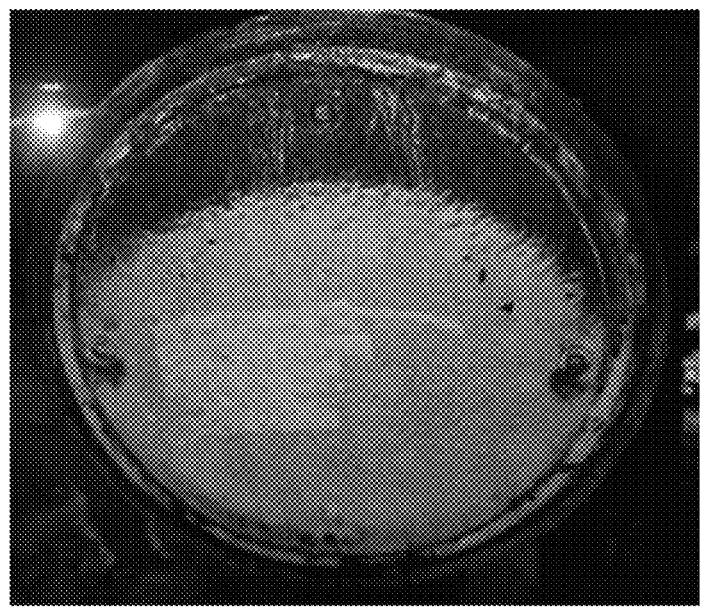
FIG. 18 is a photograph of an evaporator cover after two weeks of conventional juice treatment at Mill #5, the covering showing hard scale.
Figure 19:
FIG. 19 is a photograph of evaporator cover after two weeks of application with liquid sodium permanganate treatment provided in accordance with preferred embodiments of the present invention at Mill #5, the tubes showing reduced hard scale.

Juice purities from all area mills for 2017-2018 YTD crops are shown in FIG. 15. ANOVA analysis was performed on year-to-date purities. Because there are fewer data points, the confidence intervals are wider. The same trend is observed—reduced purity loss when liquid sodium permanganate is used.

Evaporator Heat Transfer

At Mill #3, the addition of liquid sodium permanganate during the 2017 harvest season resulted in significantly reduced downtime and chemical costs for evaporator cleaning.

During a "normal" season, Mill #3 took evaporators off-line for descaling and cleaning every 11-12 days (see Table 2 below, 2015 and 2016 data). In 2017, with liquid sodium permanganate treatment, the time between cleanings was nearly doubled to 22 days. Mill #3 set a Mill #3 production record for the average tons of cane processed each day, and for the total tons of cane processed for the year.

TABLE 2

Mill #3 Cleanings With and Without SucrOx ™ Liquid Permanganate Treatment

|  | Not SucrOx Treated Cane |  | SucrOx Treated |
| --- | --- | --- | --- |
| Crop Year | 2015 | 2016 | 2017 |
| Total Tonnage | 1,280,595 | 1,229,166 | 1,476,935 |
| Number of Days | 98 | 93 | 111 |
| Number of Washouts on #1 Set | 9 | 8 | 5 |
| Days per Washout #1 Set | 11 | 12 | 22 |

Other mills that used liquid sodium permanganate observed that the evaporator scale was much softer and more easily washed out than when liquid sodium permanganate was not used. As a result, there was lower usage of caustic and phosphoric acid cleaning chemicals.

Mill #4 is the only mill in Louisiana which utilizes cold lime treatment of the mixed juice. The other mills that tested liquid sodium permanganate utilized hot lime of the mixed juice. It is theorized that the fouling and scaling is different because of the difference in liming. Regardless, these mills also saw improvements in the evaporator scaling. FIGS. 16-19 show the evaporator at Mill #5. The evaporator sets at Mill #5 are routinely cleaned every 2 weeks. Under their conventional program (dextranase, amylase, carbamate), the scale throughout the evaporator body was very hard. See FIG. 16. When Mill #5 tests included liquid sodium permanganate provided in accordance with the present invention, the very hard scale on evaporators was eliminated. A soft sludge was predominant throughout the evaporator body. See FIG. 17. This soft scale could be cleaned off more easily and required much less acid to clean. Similar results with evaporator cleanliness were observed at all 4 mills that fed SucrOx™ in 2018.

Figure 20:
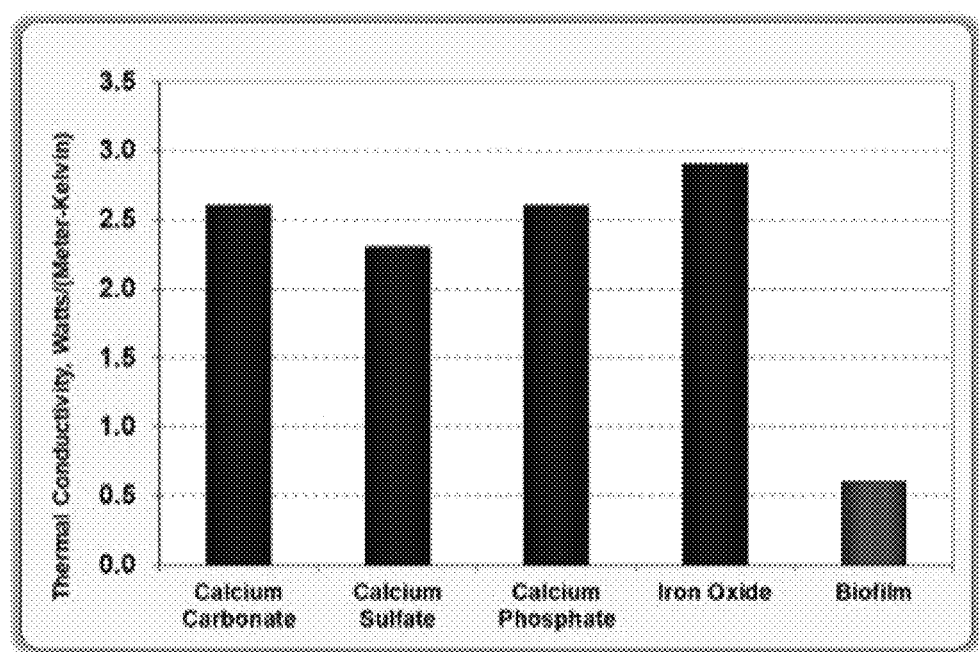
FIG. 20 is a graph showing the thermal conductivity of various deposits.

There are two theories regarding liquid sodium permanganate treatment and improved evaporator performance. One theory is that improved mill cleanliness when using liquid sodium permanganate helps to reduce film formation caused by dextran, polysaccharides, and other organics. These organic films have a significantly lower thermal conductivity than inorganic scalants such as calcium carbonate, calcium sulfate, calcium phosphate, and iron oxide. When films insulate the exchange surfaces, heat transfer is reduced, necessitating cleaning. See FIG. 20. The other theory is that improved removal of inorganics, and especially silica, reduces the loading and scaling rate of the evaporators.

Impact on Mill Cleanliness and Fouling

When using liquid sodium permanganate, milling equipment is noticeably cleaner than with the current processing aids used in sugar mills. Improved cleanliness has been observed throughout treated areas, including knives, cush cush drag, crusher and other mills, rotary screens, semi-wet deck surfaces, and evaporators.

Figure 21:
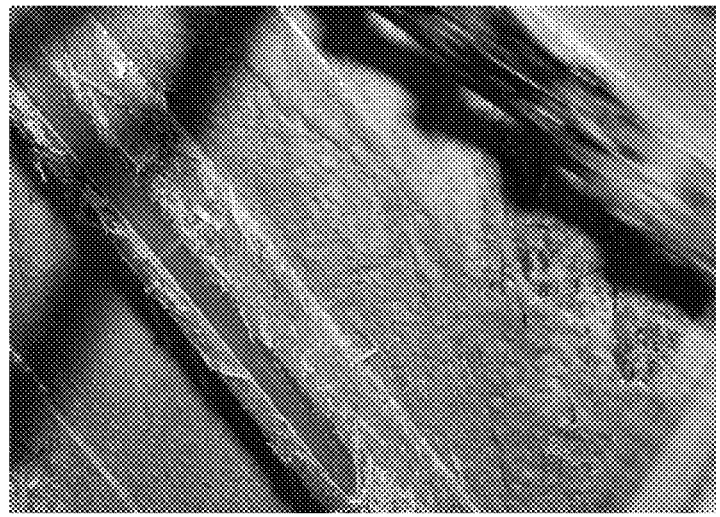
FIG. 21 is a photograph showing fouling of a cush cush drag treated with dextranase, a biocide, and amylase, absent treatment with liquid sodium permanganate.
Figure 22:
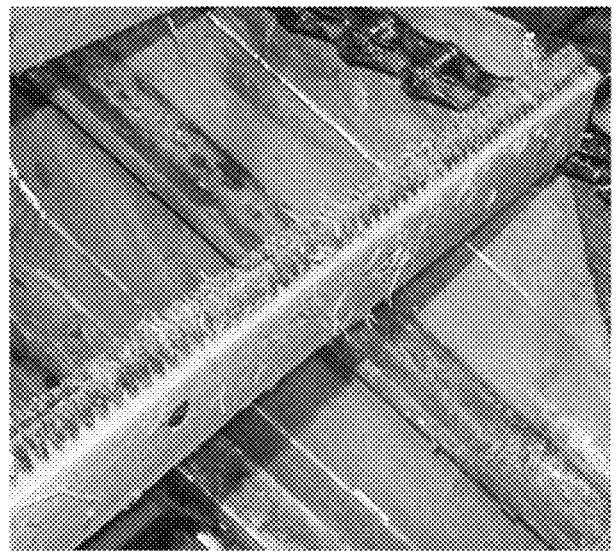
FIG. 22 is a photograph showing reduced fouling of a cush cush drag after 48 hours of liquid sodium permanganate treatment in the mill provided in accordance with preferred embodiments of the present invention.

FIG. 21 is a photograph of the cush cush area of Mill #4 with traditional chemicals added, namely, dextranase, biocide, and amylase. FIG. 22 is taken after 48 hours while on approximately 30 ppm dosages of liquid sodium permanganate. A noticeable decrease in the amount of fouling of partially wetted surfaces of the cush cush drag is observed after SucrOx™ is used.

Figure 23:
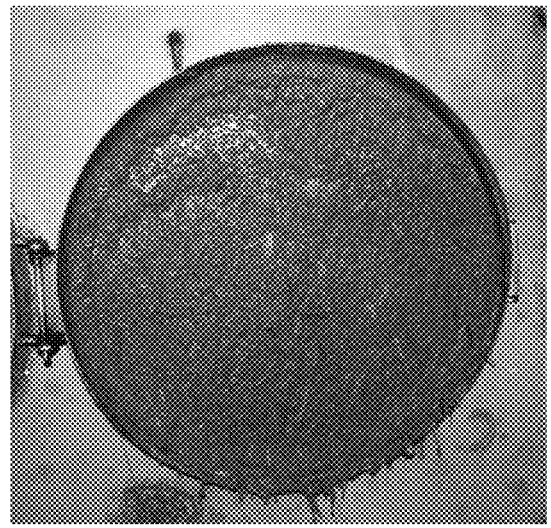
FIG. 23 is a photograph showing a crusher inspection hatch cover treated with conventional chemicals, namely, dextranase, biocide and amylase.
Figure 24:
FIG. 24 is a photograph showing a different view of a crusher inspection hatch cover treated with conventional chemicals, namely, dextranase, biocide and amylase.
Figure 25:
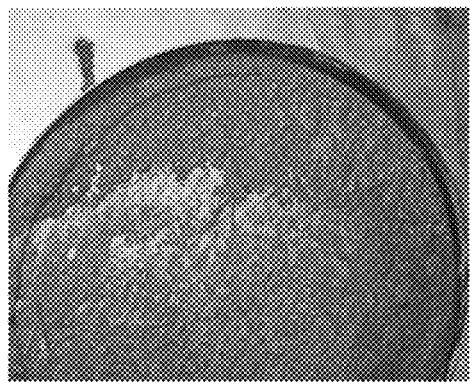
FIG. 25 is a photograph showing a crusher inspection hatch cover after 24 hours of treatment with liquid sodium permanganate provided in accordance with preferred embodiments of the present invention.
Figure 26:
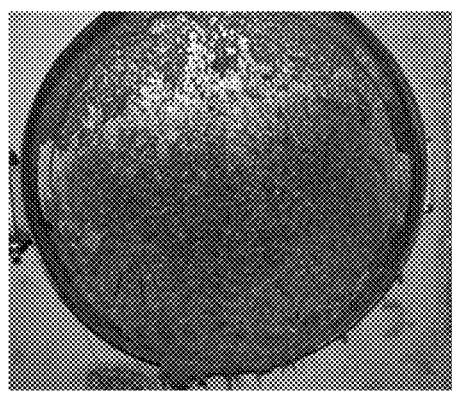
FIG. 26 is a photograph showing a crusher inspection hatch cover after 48 hours of treatment with liquid sodium permanganate provided in accordance with preferred embodiments of the present invention.
Figure 27:
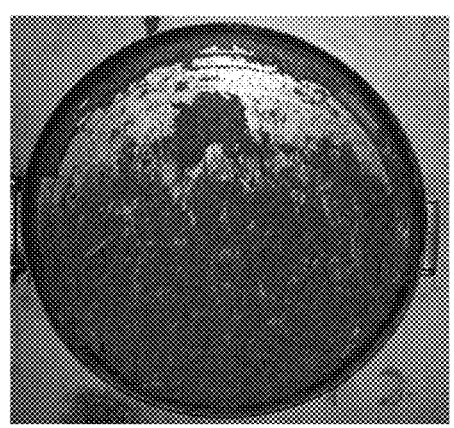
FIG. 27 is a photograph showing a crusher inspection hatch cover after 120 hours of treatment with liquid sodium permanganate provided in accordance with preferred embodiments of the present invention.

FIGS. 23-27 show an inspection cover at the crusher mill of Mill #4. FIGS. 23-24 show a baseline from the Mill #4 crusher with conventional chemicals added, namely, dextranase, biocide and amylase. FIGS. 25-27 show reduced fouling of the inspection cover after 24 hours, 48 hours, and 120 hours, respectively, of treatment in Mill #4 with approximately 30 ppm liquid sodium permanganate provided in accordance with the present invention.

Figure 28:
FIG. 28 is a photograph showing a rotary screen treated with conventional dextranase, biocide and amylase.
Figure 29:
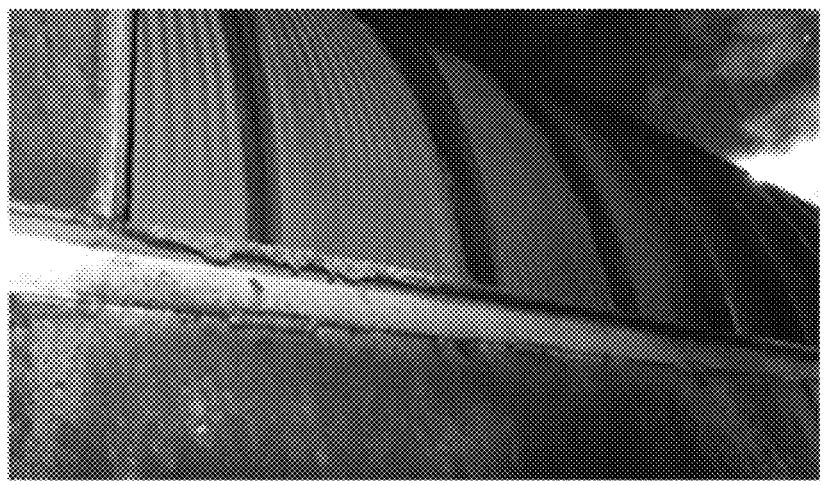
FIG. 29 is a photograph showing reduced fouling of a rotary screen used during processes that included liquid sodium permanganate treatment provided in accordance with the present invention.

FIGS. 28-29 show the rotary screens at Mill #4, wherein FIG. 28 shows the rotary screen during treatment with conventional dextranase, biocide and amylase, and wherein FIG. 29 shows reduced fouling of the rotary screen used during processes that included liquid sodium permanganate treatment provided in accordance with the present invention.

Figure 30:
FIG. 30 is a photograph showing a knives section of a sugar milling process, the knives shown after treatment with liquid sodium permanganate provided in accordance with preferred embodiments of the present invention.
Figure 31:
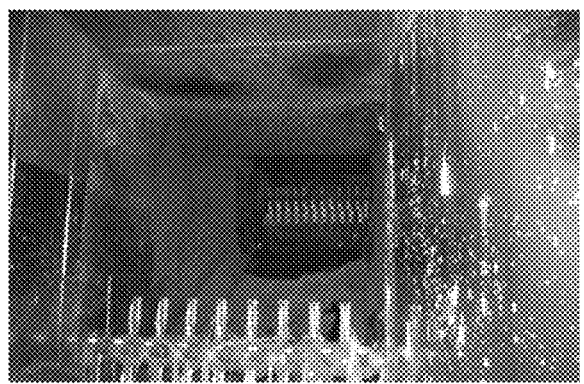
FIG. 31 is a photograph showing another view of a knives section of a sugar milling process, the knives shown after treatment with liquid sodium permanganate provided in accordance with preferred embodiments of the present invention.

FIGS. 30-31 show the knives at Mill #4 after liquid permanganate treatment provided in accordance with the present invention. The corresponding section was opened during a pause in processing and the knives were replaced. Contractors and Mill #4 personnel expressed that the system opened much cleaner. There was no slime, and the metal surfaces were clean and free of buildup. This was much different than prior openings. Similar results have been observed at all mills.

Tracking Manganese Through the Mill

When liquid sodium permanganate, a manganese-based compound, is fed early in the milling process, an important question is whether its introduction adds any additional manganese to the final sugar product. To explore this question, samples were collected during the various test runs at the three aforementioned mills. All samples were analyzed using Standard Method 3120 Metals by inductively coupled plasma ("ICP").

Figure 32:
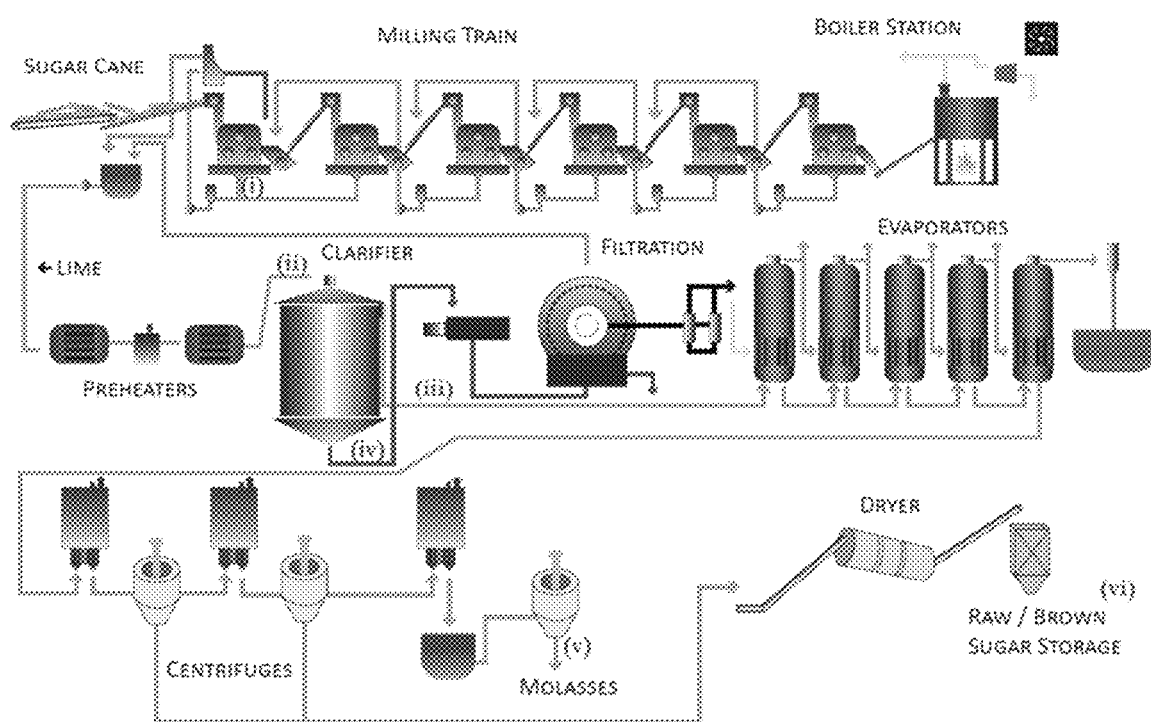
FIG. 32 is a diagram showing sampling locations (i)-(vi) in a sugar milling process, as further described herein, where samples were taken to test for presence of manganese into the sugar being processed.

The sampling locations were consistent from mill to mill and included: (i) crusher juice before liquid sodium permanganate addition; (ii) clarifier inlet; (iii) clarifier outlet; (iv) clarifier muds; (v) molasses; and (vi) final raw brown sugar. See FIG. 32.

For comparison at each location, untreated cane juice samples and cane juice samples treated with liquid sodium permanganate were collected, analyzed, and compared. Previous industry testing has shown that raw sugar contains low levels of various metals, including iron and manganese. This should be expected because they are essential nutrients for plant growth and are present in most soils. The Cane Sugar Handbook 12th Edition, Table 2.5 (Chen and Chou) reports data on 11 metals commonly found in raw sugar, including manganese, which typically runs 1-6 ppm.

Figure 33:
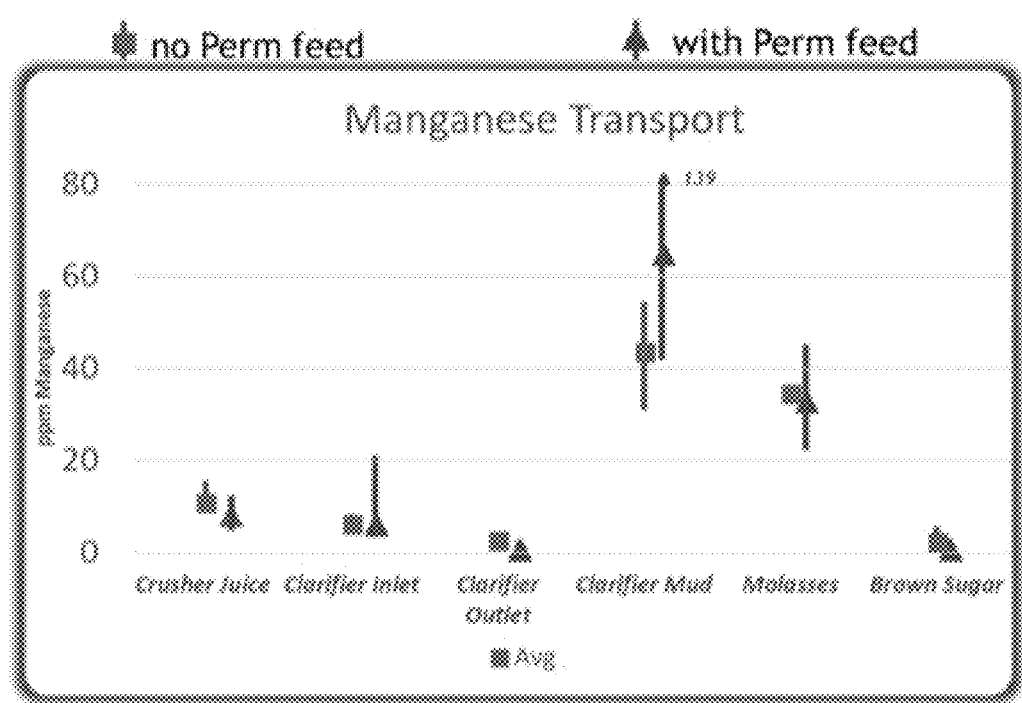
FIG. 33 is a graph showing manganese transport in a sugar mill.

For the mill samples, untreated cane juice manganese concentrations mirrored the levels reported in the Cane Sugar Handbook 12th Edition (Chen and Chou). With liquid sodium permanganate treatment, the manganese levels decreased in the molasses and the final brown sugar. As expected, the manganese precipitates out of the sugar juice and deposits in the clarifier muds, where it is removed from the process. See FIG. 33.

Figure 34:
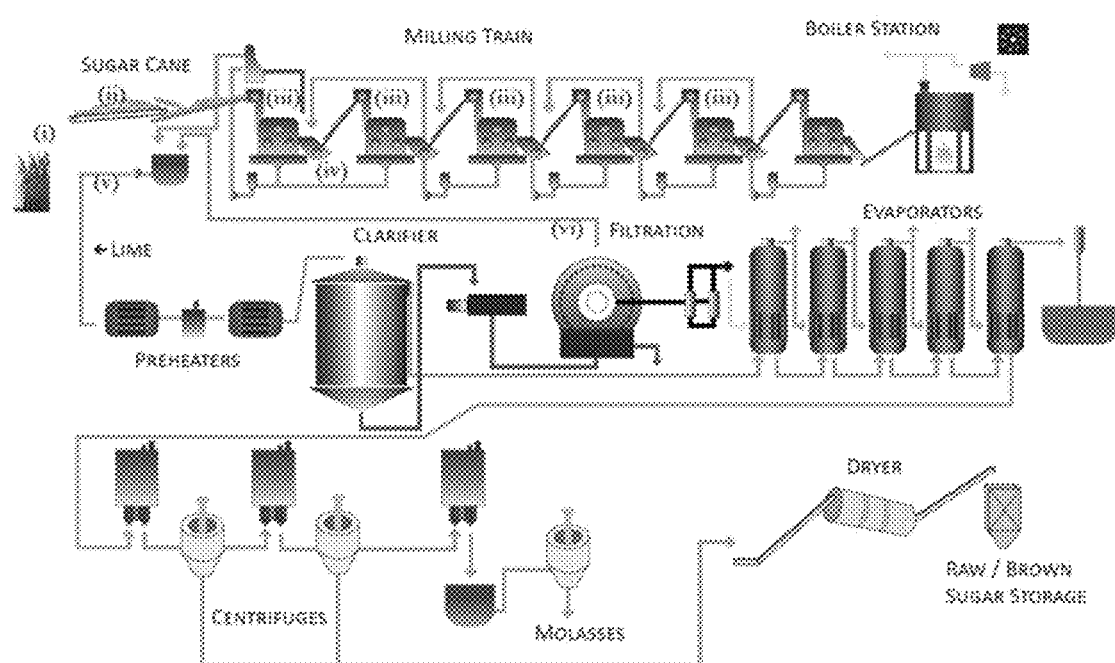
FIG. 34 is a diagram showing optional locations (i)-(vi) for application of sodium permanganate in accordance with preferred embodiments of the present invention in a sugar milling process, as further described herein.

As discussed, and as shown above, sodium permanganate is an eco-friendly oxidizing agent that has been historically used safely to purify drinking water. Permanganate's sanitation and coagulation activity makes it an effective innocuous compound for use in sugarcane juice as a disinfectant. The biocide compounds of the prior art used by mills for juice disinfection are either ineffective under mill processing time constraints, or toxic to people and the environment, or both. Permanganate's sanitation and coagulation activity make it an effective benign compound for use in sugarcane juice as a disinfectant, and it targets *Leuconostoc* which forms exopolysaccharides that negatively impact sugar quality and mill processing. Application of sodium permanganate in accordance with preferred embodiments of the present invention to sugarcane juice or its byproducts may be applied at one or more of the following locations: cane storage yard (i), cane conveyor (ii), the tandem mill and/or the imbibition water used to wash the milled crop at the tandem mills; (iii), cush cush (iv), mixed juice (v), and clarifier muds filtrate being recycled (vi). See FIG. 34. When liquid sodium permanganate is applied to sugar juice it may be added before or after the juice is extracted in a given process step. When metals, brix, turbidity, pH, ATP (adenosine triphosphate) and CFU (colony forming units) are evaluated in crusher juice, mixed juice, flash heated lime juice, clarified juice, clarification mud, bagacillo, and juice from cane billets of approximately 8 inches or whole stalks, treatment with sodium permanganate in accordance with preferred embodiments of the present invention resulted in the precipitation of a majority of residual manganese and other metals into the clarifier mud. Also, both laboratory evaluation and mill tests indicate a reduction in both microbial growth, and sample turbidity.

While specific embodiments of the invention have been shown and described, it is envisioned that those skilled in the art may devise various modifications without departing from the spirit and scope of the present invention.

The invention claimed is:

1. A method for improving production of sugar from sugar crops, the method comprising the steps of:
   (I) preparing a sugar crop to form a prepared sugar crop for milling in a sugar mill to extract sugar therefrom;
   (ii) optionally applying a first application of an aqueous permanganate solution to the prepared sugar crop;
   (iii) conveying the prepared sugar crop to the sugar mill;
   (iv) optionally applying a second application of the aqueous permanganate solution to the prepared sugar crop as the prepared sugar crop is being conveyed to the sugar mill;
   (v) processing the prepared sugar crop in a tandem mill of the sugar mill to form a processed sugar crop;
   (vi) optionally applying a third application of the aqueous permanganate solution to the processed sugar crop at the tandem mill and/or to imbibition water used to wash the processed sugar crop at the tandem mills;
   (vii) forming cush cush and extracting sugar juice from the processed sugar crop to form extracted sugar juice;
   (viii) optionally applying a fourth application of the aqueous permanganate solution to the cush cush;
   (ix) optionally applying a fifth application of the aqueous permanganate solution to the extracted sugar juice;

(x) clarifying the extracted sugar juice in a clarifier to form clarified sugar juice and clarifier muds;
(xi) filtering the clarifier muds to form a clarifier muds filtrate; and
(xii) optionally applying a sixth application of the aqueous permanganate solution to the clarifier muds filtrate;
wherein at least one of the optionally applying steps (ii), (iv), (vi), (viii), (ix), and (xii) is performed;
wherein the aqueous permanganate solution comprises approximately 10% to approximately 30% by weight permanganate; and
wherein the aqueous permanganate solution is dosed in concentrations ranging from approximately 1 parts per million to approximately 100 parts per million.

2. The method of claim 1, wherein the sugar crop is sugar cane, sugar beets, or sweet sorghum.

3. The method of claim 1, wherein the aqueous permanganate solution comprises sodium permanganate.

4. The method of claim 3, wherein the aqueous permanganate solution is dosed in concentrations ranging from approximately 5 parts per million to approximately 30 parts per million.

5. The method of claim 1, wherein the aqueous permanganate solution comprises potassium permanganate.

6. The method of claim 1, wherein at least two of the optionally applying steps (ii), (iv), (vi), (viii), (ix), and (xii) are performed.

7. The method of claim 6, wherein at least three of the optionally applying steps (ii), (iv), (vi), (viii), (ix), and (xii) are performed.

8. The method of claim 7, wherein at least four of the optionally applying steps (ii), (iv), (vi), (viii), (ix), and (xii) are performed.

9. The method of claim 1, wherein the preparing step (i) comprises a cutting of the sugar crop into billets and wherein the applying step (ii) comprises an application of the aqueous permanganate solution to the cut ends of the billets.

10. The method of claim 1, wherein the aqueous permanganate solution comprises approximately 20% by weight permanganate.

11. The method of claim 1, wherein the applying steps (ii), (iv), (vi), and (viii) comprise the application of the aqueous permanganate solution by spraying.

12. The method of claim 1, wherein the applying steps (vi), (ix), and (xii) comprise the application of the aqueous permanganate solution by injection into the imbibition water of step (vi), the extracted sugar juice of step (ix), and the clarifier muds filtrate of step (xii), respectively.

13. The method of claim 1, wherein a purity of at least one of the extracted sugar juice and the clarified sugar juice is improved as compared to a purity of sugar juice formed in processes where the aqueous permanganate solution is absent.

14. The method of claim 1, wherein a quantity of microbes in at least one of the extracted sugar juice and the clarified sugar juice is reduced as compared to a quantity of microbes in sugar juice formed in processes where the aqueous permanganate solution is absent.

15. The method of claim 1, wherein an overall yield of sugar produced in accordance with the method of claim 1 is increased as compared to an overall yield of sugar produced in accordance with methods where the aqueous permanganate solution is absent.

16. The method of claim 1, further comprising a step (xiii) concentrating the clarified sugar juice in an evaporator, wherein a heat transfer efficiency of the evaporator is improved as compared to a heat transfer efficiency of an evaporator used in processes where the aqueous permanganate solution is absent.

17. The method of claim 1, the processing step (v) further comprising a use of knives to cut the prepared sugar crop and the forming step (vii) further comprising a use of a drag in connection with the cush cush, wherein a fouling and a scaling of the knives and the drag are reduced as compared to a fouling and scaling of knives and drags used in processes where the aqueous permanganate solution is absent.

18. The method of claim 1, wherein a turbidity of the clarified sugar juice produced in accordance with the method of claim 1 is reduced as compared to a turbidity of sugar juice formed in accordance with processes where the aqueous permanganate solution is absent.

19. A method for improving sugar production from sugar crops using an aqueous permanganate solution having at least two effects that are coincident during the sugar production, the method comprising the steps of:
(i) preparing a sugar crop to form a prepared sugar crop for milling in a sugar mill to extract sugar therefrom;
(ii) optionally applying a first application of an aqueous permanganate solution to the prepared sugar crop;
(iii) conveying the prepared sugar crop to the sugar mill;
(iv) optionally applying a second application of the aqueous permanganate solution to the prepared sugar crop as the prepared sugar crop is being conveyed to the sugar mill;
(v) processing the prepared sugar crop in a tandem mill of the sugar mill to form a processed sugar crop;
(vi) optionally applying a third application of the aqueous permanganate solution to the processed sugar crop at the tandem mill and/or to the imbibition water used to wash the processed sugar crop at the tandem mills;
(vii) forming cush cush and extracting sugar juice from the processed sugar crop to form extracted sugar juice;
(viii) optionally applying a fourth application of the aqueous permanganate solution to the cush cush;
(ix) optionally applying a fifth application of the aqueous permanganate solution to the extracted sugar juice;
(x) clarifying the extracted sugar juice in a clarifier to form clarified sugar juice and clarifier muds;
(xi) filtering the clarifier muds to form clarifier muds filtrate; and
(xii) optionally applying a sixth application of the aqueous permanganate solution to the clarifier muds filtrate being recycled;
wherein at least two of the optionally applying steps (ii), (iv), (vi), (viii), (ix), and (xii) are performed;
wherein the aqueous permanganate solution comprises approximately 0.01% to approximately 50% by weight permanganate;
wherein the milling in the sugar mill comprises the use of milling equipment; and
wherein the at least two effects of the aqueous permanganate solution on the sugar production are selected from the group consisting of: (i) a reduction in microbe quantity in the prepared sugar crop, the processed sugar crop, the extracted sugar juice, or the clarified sugar juice; (ii) a clarifying effect on the extracted sugar juice or the clarified sugar juice; (iii) a reduced turbidity effect on the extracted sugar juice or the clarified sugar juice; and (v) a reduced fouling effect on the milling equipment; and
wherein the aqueous permanganate solution is dosed in concentrations ranging from approximately 1 parts per million to approximately 100 parts per million.

20. The method of claim 19, wherein the milling equipment comprises at least one knife, a cush cush drag, a crusher, a rotary screen, a semi-wet deck surface, and an evaporator.

21. The method of claim 19, wherein the aqueous permanganate solution comprises approximately 10% to approximately 30% by weight permanganate.

22. The method of claim 21, wherein the aqueous permanganate solution comprises approximately 20% by weight permanganate.

23. The method of claim 19, wherein the aqueous permanganate solution is applied in at least one of steps (ii), (iv), or (vi).

24. The method of claim 19, wherein the aqueous permanganate solution comprises sodium permanganate.

\* \* \* \* \*